United States Patent [19]

Miyashita et al.

[11] Patent Number: 4,721,398

[45] Date of Patent: Jan. 26, 1988

[54] BEARING DEVICE FOR ROTARY MACHINE

[75] Inventors: Kazuya Miyashita, Chiba; Akihiro Ookita, Yokohama; Shingo Yamauchi, Ichikawa, all of Japan

[73] Assignee: Ishikawajima-Harima Jokogyo Kabushiki Kaisha, Japan

[21] Appl. No.: 895,750

[22] Filed: Aug. 12, 1986

[30] Foreign Application Priority Data

| Aug. 22, 1985 [JP] | Japan | 60-127280 |
| Aug. 26, 1985 [JP] | Japan | 60-128953 |

[51] Int. Cl.⁴ ............................................. F16C 32/06
[52] U.S. Cl. ...................................... 384/99; 384/466; 384/535
[58] Field of Search ................. 384/99, 466, 537, 542, 384/510, 535

[56] References Cited

U.S. PATENT DOCUMENTS

| 3,722,967 | 3/1973 | Lewis | 384/466 |
| 4,527,910 | 7/1985 | Fleming | 384/99 |
| 4,605,316 | 8/1986 | Utecht | 384/99 |

Primary Examiner—Lenard A. Footland

[57] ABSTRACT

An oil film damper whose one portion is supported, whose free end portion or portions define oil film formation portions and which has a Rahmen or rigid frame structure is used so that a minimum quantity of lubricating oil only sufficient to fill clearances in which oil films are formed can have a function of satisfactorily damping shaft vibrations. A jet of lubricating oil fed from the exterior of the oil film damper is directly supplied to each ball bearing so that the satisfactory lubrication of ball bearings is ensured, the overall function of the bearing device is improved and a service life thereof is increased.

7 Claims, 8 Drawing Figures

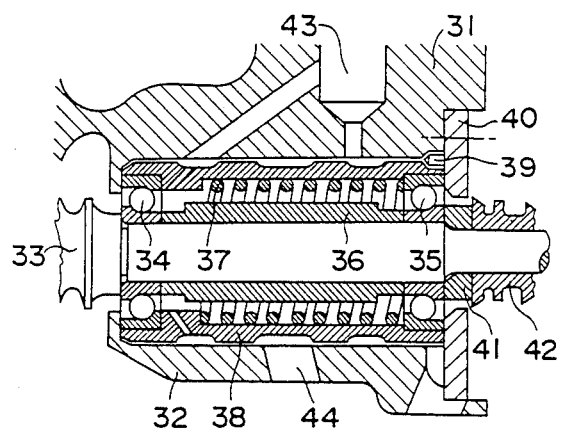
Fig. 1 PRIOR ART
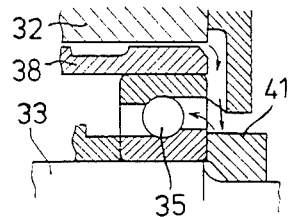
Fig. 2 PRIOR ART
Fig. 3 PRIOR ART
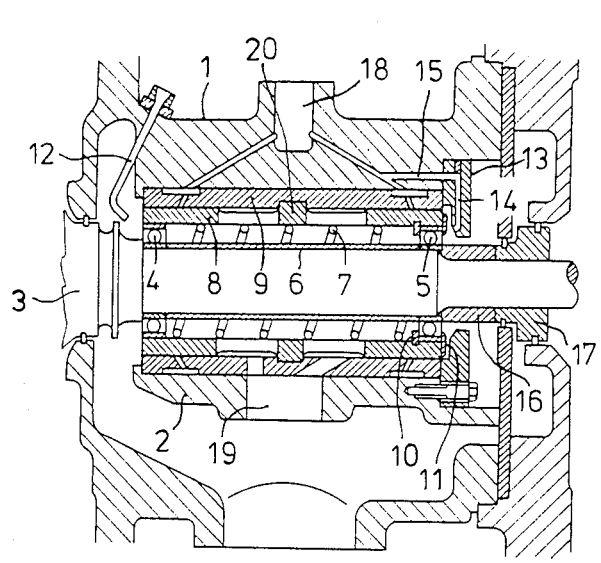
Fig. 4

BEARING DEVICE FOR ROTARY MACHINE

BACKGROUND OF THE INVENTION

The present invention relates to a bearing device for use in a rotary macine such as a turbocharger which is satisfactorily capable of absorbing and damping vibrations and which ensures satisfactory lubrication so that a service life of the bearing device can be increased.

Conventional oil film dampers used in small-sized turbochargers having ball bearings may be divided into a complete float supporting type and a semi-float supporting type. In the complete float supporting type bearing device, an oil film damper is supported only by an oil film and its movement is not restricted. In the semi-float supporting type bearing devices, a retaining pin or the like is fixed to one end of the oil film damper or one end of the oil film damper has a flange so as to prevent the rotation of an oil film damper.

FIG. 1 shows, for instance, a bearing device which is used in a small-sized turbocharger and has a semi-float supporting type oil film damper. Reference numeral 31 designates a bearing housing; 32, a portion of the housing 31; 33, a turbine shaft; 34, a ball bearing on the side of a turbine; 35, a ball bearing on the side of a compressor; 36, a bearing spacer; 37, a preloaded spring; 38, an oil film damper; 39, a retaining pin for preventing the oil film damper 38 from rotating; 40, a damper retainer; 41, an oil thrower spacer; 42, an oil thrower; 43, an oil inlet; 44, an oil outlet.

In the bearing device for the turbocharger of the type as shown in FIG. 1, the oil film damper 38 and turbine shaft 33 are lifted by the pressure of the lubricant fed to an oil film formed between the inner surface of the bearing housing portion 32 and the outer peripheral surface of the oil film damper 38. The load-carrying oil film is capable of damping vibrations transmitted from turbine shaft 33. The above-described capabilities are attained because the turbocharger is small in size.

Since the turbocharger is small in size, the bearing device of the type as shown in FIG. 1 presents no problem; but when the rotary machines become large in size and the weight of a rotating shaft is increased, enlargement by only scaling up the oil film damper 38 of the type as shown in FIG. 1 is not enough to lift up the turbine shaft 33 unless the lubricant under a considerable pressure is fed to the load-carrying oil film. The increase in pressure of the lubricant results in the increase in quantity of lubricant to be fed to the turbocharger. As a result, there arise the problems that end leakage is increased and that the mechanical efficiency is decreased. In addition, there arises the problem that carbon bridges are produced due to the high temperature of the turbine.

With the ball bearings as shown in FIG. 1, the DN value is extremely higher than a million so that it is essential to form a complete oil film on the bearing surface in order to ensure the service life of the bearings. However, the ball bearings 34 and 35 are mounted in the oil film damper 38 so that it becomes difficult to directly lubricate them from the exterior and consequently part of the oil film formed around the outer cylindrical surface of the oil film damper 38 is used to lubricate the ball bearings 34 and 35. For instance, as shown in FIG. 2, the so-called jet system may be employed in which a lubrication hole 45 is drilled through the oil film damper 38 such that the lubricating oil is fed to the ball bearing 34 in the direction indicated by the arrow. Furthermore, as shown in FIG. 3, the so-called splash lubrication system may be employed in which the lubricating oil which flows out of an end of the oil film damper 38 is caused to impinge on the oil thrower spacer 41 carried by the turbine shaft 33 as indicated by the arrows so that the lubricating oil is atomized, thus forming an atmosphere of lubricating oil mist.

However, when the operating conditions become severe, the lubricating systems as shown in FIGS. 2 and 3 cannot satisfactorily lubricate the ball bearings 34 and 35. Especially when the ball bearings are provided with a cage or a preloaded spring 37 is disposed in the oil film damper 38, there arises the problem that the jet of the lubricating oil is interrupted and the ball bearings are not satisfactorily lubricated.

The present invention was made to substantially overcome the above and other problems encountered in the conventional bearing devices for rotary machines. More particularly, in a bearing device for a rotary machine of the type having an oil damper fitted over ball bearings, the present invention is characterized in that the oil film damper is of a semi-float type in which the oil film damper is supported at one portion thereof and the ends of the oil film damper are maintained free and a plurality of beam-like arms interconnect between the supported portion of the oil film damper and the oil film formation portion at each end of the oil film damper, thereby providing a Rahmen or rigid frame structure. In addition, the bearing device in accordance with the present invention is characterized in that satisfactory lubrication can be accomplished within a limited narrow space so that the service life of ball bearings can be increased.

Therefore, even in the case of a large-sized rotary machine having a heavy rotating shaft, a portion of the oil film damper is inherently supported by the bearing housing and the ends of the oil film damper are maintained free so that the formation of the oil films at those portions at the ends of the oil film damper is facilitated. As a result, the bearing device of the present invention can satisfactorily absorb and damp vibrations at a minimum feeding pressure of lubricating oil. In addition, the structure between the supported portion and the oil film formation portion is a Rahmen or rigid frame structure comprising a plurality of beam-like arms so that the oil film damper has a suitable degree of rigidity. Moreover, a space between the adjacent arms provides an oil passage so that the lubricating oil can be easily discharged. Furthermore, the manufacturing of the oil film damper in accordance with the present invention is easy because a plurality of arms can be defined when a plurality of slots are cut through the cylindrical surface of the oil film damper.

According to the present invention, the ball bearings mounted in the oil film damper are not lubricated alone with part of the oil film formed over the outer surface of the oil film damper as in the conventional bearing devices, but are lubricated directly by a high velocity jet of lubricating oil fed from the exterior of the oil film damper. As a result, the lubrication of the ball bearings is positively ensured.

The above and other objects, effects, features and advantages of the present invention will become more apparent from the following description of a preferred embodiment thereof taken in conjunction with the accompanying drawings.

BRIEF DESCRIPTION OF THE DRAWINGS

FIG. 1 is a longitudinal sectional view of a conventional bearing device for a rotary machine;

FIG. 2 is a fragmentary sectional view, on enlarged scale, used for the explanation of a conventional lubricating system;

FIG. 3 is a fragmentary sectional view, on enlarged scle, used to explain another conventional lubricating system;

FIG. 4 is an axial sectional view of a preferred embodiment of a bearing device in accordance with the present invention;

DETAILED DESCRIPTION OF THE PREFERRED EMBODIMENTS

Figure 5:
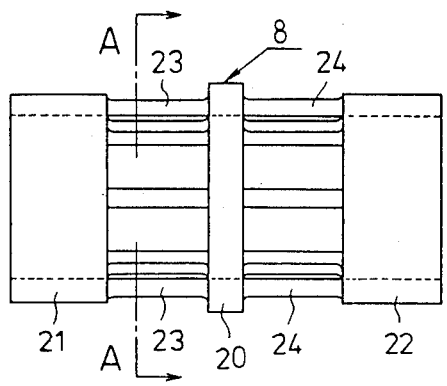
FIG. 5 is a front view of an oil film damper thereof.

FIG. 4 shows a preferred embodiment of the present invention in which reference numeral 1 designates a bearing housing of a large-sized turbocharger; 2, a portion thereof; 3, a turbine shaft; 4, a ball bearing on the side of a turbine; 5, a ball bearing on the side of a compressor; 6, a bearing spacer; 7, a preloaded spring; 8, an oil film damper; 9, a bearing sleeve, 10, a stopper ring; 11, a retainer for retaining the outer race of the ball bearing 5; 12, a jet nozzle tube; 13, a retaining member for preventing the damper 8 from being pulled out of the housing 1; 14, a jet lubrication hole; 15, an intercommunicating hole; 16, an oil thrower spacer; 17, an oil thrower; 18, a lubricating oil inlet; and 19, a lubricating oil outlet.

Figure 6:
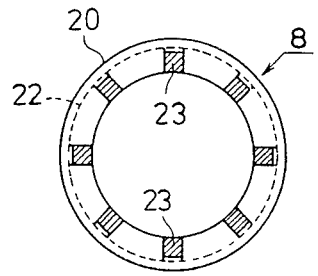
FIG. 6 is a sectional view taken along the line A—A of FIG. 5.
Figure 7:
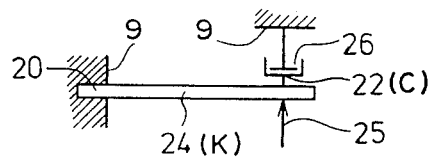
FIG. 7 is a view used to explain the mode of operation of the oil film damper shown in FIG. 5.

FIGS. 5 and 6 show the construction of the oil film damper 8. Reference numeral 20 designates an annular, enlarged-diameter supporting portion intermediate the ends of the oil film damper 8; 21, an annular oil film formation portion fitted over the outer race of the ball bearing 4 on the side of the turbine; 22, another annular oil film formation portion fitted over the outer race of the ball bearing 5 on the side of the compressor; 23, beam-like arms interconnecting between the center supporting portion 20 and the oil film formation portion 22; and 24, beam-like arms interconnecting between the center supporting portion 20 and the oil film formation portion 22. The center supporting portion 20 of the oil film damper 8 is supported by the bearing sleeve 9 while the oil film formation portions 21 and 22 at the end portions of the oil film damper 8 are free and semi-floated. The portions between the center supporting portion 20 on the one hand and the oil film formation portions 21 and 22 on the other hand have a Rahmen or rigid frame structure comprising a plurality of axially extending arms 23 and 24. In other words, the portion between the center supporting portion 20 and the oil film formation portion 21 or 22 is in the form of the cylinder defined by a plurality of beams. The center supporting portion 20 of the oil film damper 8 is securely supported by the bearing sleeve 9 and the lubricating oil under pressure is fed through the lubricating oil inlet 18 to the annular oil film formation portions 21 and 22 at the end portions of the oil film damper 8 so that the oil films are formed. The oil films thus formed absorb and damp vibrations of the ball bearings 4 and 5. Such construction as described above is equivalent to a cantilever shown in FIG. 7. More particularly, FIG. 7 shows the right half of the oil film damper 8 shown in FIG. 5. The left half is symmetrical about the center supporting portion 20 with the right half. It follows therefore that both the right and left halves of the oil film damper 8 are based upon the same principle. In FIG. 7, reference numeral 25 designates shaft vibrations transmitted through the ball bearing; and 26, an oil film (acting as a hydraulic cylinder) formed over the cylindrical outer surface of the oil film formation portion. The axial length of the oil film forming portion 22 and the thickness of the oil film are determined depending upon a desired damping coefficient C and the arms 24 have a suitable degree of rigidity K.

Referring back to FIG. 4, the jet nozzle tube 12 extends from the exterior of the bearing housing 2 through a lubricating oil discharge space defined between a turbine gas sealing member of the bearing housing 1 which includes the bearing housing portion 2 and a bearing member for supporting the oil film damper 8, and is bent at a suitable angle so that the nozzle hole of the jet nozzle tube 12 is in opposed relationship with the ball bearing 4 on the side of the turbine. Therefore, the lubricating oil fed from the exterior of the bearing device flows through the jet nozzle tube 12 to directly lubricate the ball bearing 4 on the side of the turbine. The jet nozzle tube 12 is equipped through an opening used for the insertion of the turbine shaft 3 at an angle and the upper end of the jet nozzle tube 12 is securely fixed at the outer surface of the bearing housing 1. Thus, the fabrication and assembly are simple.

For the lubrication of the ball bearing 5 on the side of the compressor, the retaining member 13 is used as a jet nozzle tube. More particularly, the retaining member 13 is increased in thickness as compared to the retaining member used in the conventional bearing device and the jet lubricating hole 14 extends through the retaining member 13 such that the outlet or nozzle hole of the jet lubricating hole 14 is opened at the inner surface of the retaining member 13 in opposed relationship with the ball bearing 5 on the side of the compressor. The jet lubrication hole 14 is communicated through a communicating passage 15 with a lubricating oil feed hole extending from the lubricating oil inlet 18. Thus the fabrication and assembly are also simple.

The bearing device for a large-sized turbocharger of the type shown in FIG. 4 has the oil film damper 8 described in detail above with reference to FIGS. 5 and 6. As compared with the oil film damper 38 which has no fitting and supporting portion as shown in FIG. 1, the center supporting portion 20 of the oil film damper 8 in accordance with the present invention is inherently supported by the bearing sleeve 9 so that the formation of an oil film is readily facilitated. Therefore it suffices to feed the lubricating oil in such a quantity sufficient only to fill the clearances between the oil film formation portions 21 and 22 of the oil film damper 8 and the bearing sleeve 9. Therefore, the bearing device in accordance with the present invention can satisfactorily absorb and damp the vibrations in all the range of rotational speed of the turbine shaft 3 at a minimum feed pressure of lubricating oil.

The portions between the center supporting portion 20 on the one hand and the oil film formation portions 21 and 22 on the other hand have a Rahmen or rigid frame structure comprising a plurality of beam-like arms 23 and 24. Therefore, each arm 23 or 24 acts as the cantilever as shown in FIG. 7 so that a suitable degree of rigidity is obtained for the shaft vibrations acting from the ball bearings 4 and 5 on the oil film formation portions 21 and 22. Rigidity influences a critical or whirling speed of the shaft system so that a suitable degree of rigidity must be selected for a design rotational speed. The cross sectional configuration of the arms 23 and 24 which are in the form of a beam is determined in the design stage depending upon a geometrical moment of inertia. When a large number of arms 23 and 24 are provided, it is preferable that they have a rectangular cross sectional configuration; they can be easily formed by cutting a plurality of slots equal in number to the arms 23 or 24 through the cylindrical wall of a hollow cylinder. The lubricating oil is easily discharged through the slots or slits between the adjacent arms 23 and 24.

Figure 8:
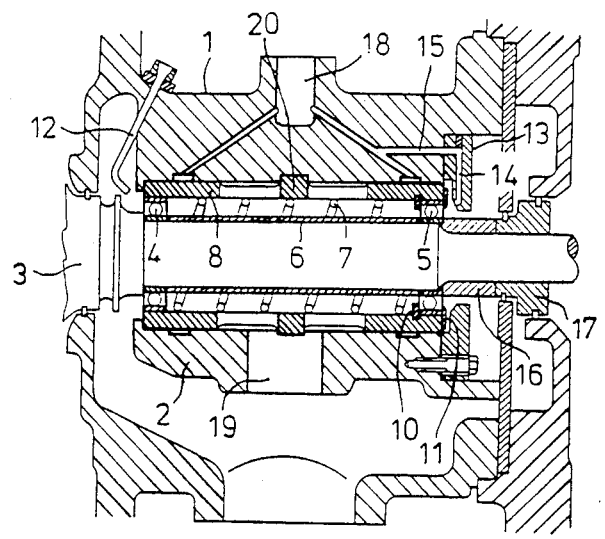
FIG. 8 is a view used to explain a further embodiment in which a supporting portion of the oil film damper is directy supported by a bearing housing.

In the preferred embodiment as shown in FIG. 4, the supporting portion 20 of the oil film damper 8 is supported by the bearing sleeve 9; but depending upon the construction of the bearing housing, the bearing sleeve 9 may be eliminated and the oil film damper 8 may be directly supported by the bearing housing 2 as shown in FIG. 8.

As described above, the jet lubrication to the ball bearings 4 and 5 can be accomplished from the turbine side and the compressor side, respectively, outside the bearing span and the directions of the jets of lubricating oil issued from the nozzle holes of the jet nozzle tube 12 and the jet lubrication hole 14 can be relatively freely selected. As a result, the possibility that the lubricating oil is interrupted by the cages of the ball bearings can be reduced so that the ball bearings 4 and 5 can be sufficiently lubricated and consequently their service life is increased. In addition, according to the present invention, the ball bearings 4 and 5 are lubricated with the oil directly fed from the exterior of the bearing device so that it is not needed to provide in the oil film damper 8 the lubricating oil holes or passages for supplying the lubricating oil for the lubrication of the ball bearings. Therefore the oil film damper 8 of the present invention can be made simple in construction as compared with the conventional oil film damper 38 shown in FIG. 1.

In the preferred embodiment described above, the ball bearings 4 and 5 on the side of the turbine and on the side of the compressor, respectively, are lubricated by the jets of lubricating oil fed from the exterior of the bearing device; but it is to be understood that only the ball bearing 4 or 5 is lubricated by the jet of lubricating oil fed from the exterior while the another ball bearing 5 or 5 is lubricated by a suitable conventional lubricating system.

As described above, in the bearing device for a rotary machine in accordance with the present invention, a portion of the oil film damper is inherently supported and the oil films are formed freely at the end portions thereof. Therefore, the shaft vibrations can be absorbed and damped for all the range of the rotational speed of the turbine shaft with a minimum quantity (feed pressure) of lubricating oil sufficient only to fill the clearances where the oil films are formed. Therefore, even when the bearing device of the present invention is used in a considerably large-sized rotary machine, the function of the oil film damper can be maintained. Furthermore, the portions between the center supporting portion on the one hand and the oil film formation portions on the other hand of the oil film damper have a Rahmen or rigid frame structure so that it becomes easy to design and construct an oil film damper having a suitable degree of rigidity. That is, in the case of the design of an oil film damper, a suitable degree of rigidity can be selected from a wide range so as to avoid dangerous factors. Furthermore, in order to form the arms each in the form of a beam, it suffices to cut a plurality of slots or slits equal in number to the arms. Thus the fabrication is simplified. Moreover, the slits or slots serve as a lubricating oil passage so that the discharge of the lubricating oil is enhanced and consequently the mechanical loss can be reduced to a minimum.

According to the present invention, the bearing device is provided with the jet nozzle extending from the exterior of the ball bearing to the latter such that the nozzle hole of the jet nozzle is in opposed relationship with the ball bearing. Therefore it becomes possible to directly issue a jet of lubricating oil toward the ball bearing from the exterior of the oil film damper. As a result, the velocity of the jet of lubricating oil is increased while the feed pressure of the lubricating oil is maintained at a suitable leve. In addition, the direction of the nozzle hole of the jet nozzle can be relatively freely selected so that the effective lubrication of the ball bearings becomes possible. As a consequence, satisfactory oil films are formed over the balls and the raceway surfaces so that a long service life of the ball bearings can be ensured. The jet nozzle is in the form of a jet nozzle tube or a jet lubrication hole machined in a suitable component part so that a wide space for the installation of the jet nozzle is not needed. That is, a narrow space can be effectively utilized.

What is claimed is:

1. A bearing device in a rotary machine of the type having ball bearins mounted in an oil film damper which in turn is disposed in a bearing housing, the improvement comprising said oil film damper being monolithic and of a semi-float type in which one portion thereof provides a supporting portion and at least one end thereof maintained free to provide an oil film forming portion, said monolithic oil film damper including a Rahmen or rigid frame positioned between said supporting portion and the oil film forming portion and having a plurality of angularly spaced apart beam-like arms inter-connecting said supporting portion and said oil film forming portion, a bearing sleeve, means on said bearing sleeve supporting said oil film damper supporting portion, and a jet nozzle mounted on said bearing housing and having a nozzle hole in opposed relationship with the ball bearing so that a jet of lubricating oil is directly issued against said ball bearing from exterior of said oil film damper.

2. A device according to claim 1, further including a jet lubrication hole formed in a retaining member which also prevents said oil film damper from being pulled out of said bearing housing.

3. A device according to claim 2 wherein each of said beam-like portions has a rectangular cross-sectional configuration, the space between adjacent beam-like portions forming an oil flow path.

4. A device according to claim 3 wherein said bearing sleeve includes a notch for attaching said oil film damper supporting portion to said sleeve, said notch having a width approximately equal the outer axial length of said supporting portion to snugly accommodate said supporting portion.

5. A device according to claim 4 further including a lubricating fluid inlet defined in said housing, and a jet fluid passage defined in said housing and fluidly connected to said inlet.

6. A device according to claim 5 further including a first fluid passage in said housing for connecting said inlet to an oil film portion located adjacent to said jet lubrication hole, said jet fluid passage eing connected to said first fluid passage, and a second fluid passage in said housing for connecting said fluid inlet to another oil film portion.

7. A device according to claim 6 further including fluid connecting means in said sleeve fluidly connecting said first and second passages of each of said oil film portions.

* * * * *